UNITED STATES PATENT OFFICE.

OSCAR GÜNTHER AND LEOPOLD HESSE, OF ELBERFELD, GERMANY, ASSIGNORS TO FARBENFABRIKEN VORM. FRIEDR. BAYER & CO., OF ELBERFELD, GERMANY, A CORPORATION OF GERMANY.

AZO DYE.

No. 877,843.

Specification of Letters Patent.

Patented Jan. 28, 1908.

Application filed November 19, 1907. Serial No. 402,813.

*To all whom it may concern:*

Be it known that we, OSCAR GÜNTHER and LEOPOLD HESSE, doctors of philosophy, chemists, citizens of the German Empire, residing at Elberfeld, Germany, Kingdom of Prussia, have invented new and useful Improvements in Azo Coloring-Matters, of which the following is a specification.

Our invention relates to the manufacture and production of new disazodyestuffs dyeing cotton from bluish-red to violet to blue shades remarkable for their fastness to light. They are obtained by first producing intermediate compounds from the diazo compounds of 1.8-aminonaphthol sulfonic acids with suitable amins, then diazotizing these intermediate products and combining the thus produced diazoazo compounds with derivatives of 2-amino-5-naphthol-7-mono-sulfonic acid.

The same dyestuffs are obtained if in the above mentioned process the diazo compounds of 1.8-amino-naphthol sulfonic acids are replaced by the diazo compounds of acidylized derivatives of these acids *e. g.* by the sulfurous acid esters, the acetyl derivatives or the arylsulfonic acid esters of 1.8-amino-naphthol sulfonic acids. The acidyl groups, such as the sulfurous acid residue, the acetyl or arylsulfonic groups which are attached to the hydroxyl group can be eliminated either from the intermediate compounds or from the final dyestuffs. The presence of the acidyl groups in the hydroxyl groups of the amino-naphthol sulfonic acids renders the hydroxyl group inactive, and prevents the formation of by-products during the production of the dyestuffs.

The new acetylized derivatives of the diazonaphthol sulfonic acids can be obtained by treating the diazo compounds of 1.8-aminonaphthol sulfonic acids with acetic acid anhydrid. The new arylsulfonic acid esters are obtained by treating in an alkaline solution 1.8-amino-naphthol sulfonic acids with arylsulfonic acid chlorids, *e. g.* benzene sulfonic chlorid, toluene sulfonic chlorid, naphthalene sulfonic chlorid etc.

The new dyestuffs are in the shape of their alkaline salts dark powders easily soluble in water. Upon reduction with stannous chlorid and hydrochloric acid the dyestuffs are decomposed 1.8-amino-naphthol sulfonic acid, a diamin and a derivative of 2.6-diamino-5-naphthol-7-sulfonic acid are formed.

In order to carry out this process we can *e. g.* proceed as follows, the parts being by weight: 341 parts of the monosodium salt of 1.8-aminonaphthol-3.6-disulfonic acid are dissolved with the necessary quantity of sodium carbonate in water to produce a neutral solution. It is then diazotized in the usual way with 69 parts of sodium nitrite and hydrochloric acid. The resulting diazo compound is introduced into a solution of 179.5 parts of the hydrochlorid of alpha-naphthylamin in water and sodium acetate is added to neutralize the free mineral acid. The mixture is acidulated and the intermediate compound is salted out, filtered off and converted into its neutral sodium salt. This is then diazotized at about 5° C. with 69 parts of sodium nitrite and hydrochloric acid and to remove any diazonaphthalene if it should be present the diazo compound is salted out and filtered off. It is then stirred up with water to a paste and is added to a solution of 315 parts of 2-phenylamino-5-naphthol-7-sulfonic acid containing an excess of sodium carbonate. The combination is complete after a short time. The mixture is gently heated and the dyestuff is salted out, filtered off and dried. It is, after being dried and pulverized, in the shape of its sodium salt a dark powder which is soluble in water with a blue color and which is soluble in concentrated sulfuric acid with a grayish-blue color. By reduction with stannous chlorid and hydrochloric acid 1-8-amino-naphthol-3.6-disulfonic acid, 1.4-diaminonaphthalene and 2-phenylamino-5-naphthol-6-amino-7-sulfonic acid are obtained. The new dyestuff dyes cotton blue shades.

In the following table the shades of some of the new dyes are given:

| Dyestuffs obtained from: | Dyes cotton: |
|---|---|
| 1) 1.8-aminonaphthol-3.6-disulfonic acid + alpha-naphthylamin + 2-diethylamino-5-naphthol-7-sulfonic acid | reddish-blue |
| 2) 1.8-aminonaphthol-3.6-disulfonic acid + alpha-naphthylamin + 2-paratolylamino-5-naphthol-7-sulfonic acid | greenish-blue |
| 3) 1.8-aminonaphthol-3.6-disulfonic acid + alpha-naphthylamin + 2-phenylamino-5-naphthol-7-sulfonic acid | blue |
| 4) 1.8-aminonaphthol-3.6-disulfonic acid + cresidin + 5.5-dioxy-2.2-dinaphthylamin-7.7-disulfonic acid | blue |
| 5) 1.8-aminonaphthol-3.6-disulfonic acid + cresidin + 2.5-aminonaphthol-1.7-disulfonic acid | violet |
| 6) 1.8-aminonaphthol-3.6-disulfonic acid + cresidin + 2-diethylamino-5-naphthol-7-sulfonic acid | reddish-blue |
| 7) 1.8-aminonaphthol-3.6-disulfonic acid + cresidin + 2-phenylamino-5-naphthol-7-sulfonic acid | violet-blue |
| 8) 1.8-aminonaphthol-3.6-disulfonic acid + paraxylidin + 2-phenylamino-5-naphthol-7-sulfonic acid | violet |
| 9) 1.8-aminonaphthol-3.6-disulfonic acid + metatoluidin + 2-phenylamino-5-naphthol-7-sulfonic acid | reddish-violet |
| 10) 1.8-aminonaphthol-3.6-disulfonic acid + metatoluidin + 2.5-aminonaphthol-1.7-disulfonic acid | reddish-violet |
| 11) 1.8-aminonaphthol-3.6-disulfonic acid + paraacetylamino-ortho-toluidin + 2-phenylamino-5-naphthol-7-sulfonic acid | violet |
| 12) 1.8-aminonaphthol-4.7-disulfonic acid + cresidin + 2-benzoylamino-5-naphthol-7-sulfonic acid | greenish-blue |
| 13) 1.8-aminonaphthol-4.7-disulfonic acid + cresidin + 2-ethylamino-5-naphthol-7-sulfonic acid | blue |
| 14) 1.8-aminonaphthol-4.7-disulfonic acid + paraacetylamino-ortho-anisidin + 2-phenylamino-5-naphthol-7-sulfonic acid | greenish-blue |
| 15) 1.8-aminonaphthol-4.7-disulfonic acid + paraxylidin + 2-phenylamino-5-naphthol-7-sulfonic acid | reddish-blue |
| 16) 1.8-aminonaphthol-4.7-disulfonic acid + cresidin + 2-phenylamino-5-naphthol-7-sulfonic acid | blue |
| 17) 1.8-aminonaphthol-4.7-disulfonic acid + cresidin + 2-diethylamino-5-naphthol-7-sulfonic acid | greenish-blue |
| 18) 1.8-aminonaphthol-4.7-disulfonic acid + cresidin + carbonyl-1.2-diamino-5-naphthol-7-sulfonic acid $C_{10}H_4\begin{subarray}{l}SO_3H\\OH\\NH\\NH\end{subarray}CO$ | greenish-blue |
| 19) 1.8-aminonaphthol-3.5-disulfonic acid + cresidin + 2-phenylamino-5-naphthol-7-sulfonic acid | blue |
| 20) 1.8-aminonaphthol-4.6-disulfonic acid + cresidin + 2-phenylamino-5-naphthol-7-sulfonic acid | blue |
| 21) 1.8-aminonaphthol-4.6-disulfonic acid + cresidin + 2-paratolylamino-5-naphthol-7-sulfonic acid | greenish-blue |
| 22) 1.8-aminonaphthol-5.7-disulfonic acid + cresidin + 2-phenylamino-5-naphthol-7-sulfonic acid | reddish-blue |
| 23) 1.8-aminonaphthol-5.7-disulfonic acid + cresidin + 2-diethylamino-5-naphthol-7-sulfonic acid | reddish-blue |
| 24) 1.8-aminonaphthol-6-sulfonic acid + cresidin + 2-phenylamino-5-naphthol-7-sulfonic acid | reddish-blue |
| 25) 1.8-aminonaphthol-5-sulfonic acid + cresidin + 2-phenylamino-5-naphthol-7-sulfonic acid | reddish-blue |
| 26) 1.8-aminonaphthol-4-sulfonic acid + cresidin + 2-phenylamino-5-naphthol-7-sulfonic acid | reddish-blue |

The above described process is carried out in an analogous manner on using other 1.8-aminonaphthol sulfonic acids, or other suitable amins to produce the intermediate compounds capable of being diazotized or other of the above mentioned components to produce the final result.

Having now described our invention and in what manner the same is to be performed, what we claim as new and desire to secure by Letters Patent is:—

1. The herein-described new azo-dyestuffs obtainable by combining the diazo compounds of 1.8-aminonaphthol sulfonic acids with suitable amins, then diazotizing these intermediate compounds and combining the thus produced diazoazo compounds with derivatives of 2-amino-5-naphthol-7-sulfonic acid, which dyestuffs are, after being dried and pulverized, in the shape of their alkaline salts dark powders soluble in water, yielding upon reduction with stannous chlorid and hydrochloric acid 1.8-aminonaphthol sulfonic acid, a diamin and a derivative of 2.6-diamino-5-naphthol-7-sulfonic acid, and dyeing cotton from bluish-red to violet to blue shades, substantially as hereinbefore described.

2. The herein-described new azo-dyestuff, which can be obtained by combining the diazo compound of 1.8-amino-naphthol-3.6-disulfonic acid with alpha-naphthylamin, diazotizing the intermediate product thus produced and combining the diazoazo compound with 2-phenylamin-5-naphthol-7-sulfonic acid, which dyestuff is, after being dried and pulverized, in the shape of its sodium salt a dark powder soluble in water with a blue color and soluble in concentrated sulfuric acid with a grayish-blue color; yielding upon reduction with stannous chlorid and hydrochloric acid 1.8-aminonaphthol-3.6-disulfonic acid, 1.4-diaminonaphthalene and 2-phenylamin-5-naphthol-6-amino-7-sulfonic acid; and dyeing cotton blue shades, substantially as hereinbefore described.

In testimony whereof we have hereunto set our hands in the presence of two subscribing witnesses.

OSCAR GÜNTHER.
LEOPOLD HESSE.

Witnesses:
  OTTO KÖNIG,
  WM. WASHINGTON BRUNSWICK.